United States Patent
Reichenbach

(10) Patent No.: US 6,371,371 B1
(45) Date of Patent: Apr. 16, 2002

(54) METHOD FOR DETERMINING THE POSITION AND/OR ORIENTATION OF A BAR CODE READER

(75) Inventor: Jürgen Reichenbach, Emmendingen (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 09/383,489

(22) Filed: Aug. 26, 1999

(30) Foreign Application Priority Data

Sep. 4, 1998 (DE) ......................................... 198 40 455

(51) Int. Cl.[7] ............................................... G06K 7/10
(52) U.S. Cl. ............. 235/454; 235/462.01; 235/462.08; 235/462.09; 235/462.2; 235/462.22; 235/470
(58) Field of Search .................. 235/462.01, 462.02, 235/462.08, 462.09, 462.14, 462.2, 462.22, 462.33, 462.15, 462.25, 462.48, 462.49, 383, 454, 470

(56) References Cited

U.S. PATENT DOCUMENTS

| | | | |
|---|---|---|---|
| 3,774,014 A | * 11/1973 | Berler ...................... | 235/61.11 |
| 4,939,355 A | * 7/1990 | Rando et al. ........... | 235/462.14 |
| 5,019,714 A | * 5/1991 | Knowles .................... | 235/467 |
| 5,291,564 A | * 3/1994 | Shah et al. .................... | 382/48 |
| 5,296,691 A | * 3/1994 | Waldron et al. ............. | 235/462 |
| 5,311,999 A | * 5/1994 | Malow et al. ............... | 235/470 |
| 5,426,288 A | * 6/1995 | Obata et al. ................. | 235/462 |
| 5,481,096 A | * 1/1996 | Hippenmeyer et al. ...... | 235/454 |
| 5,497,314 A | * 3/1996 | Novak ......................... | 235/383 |
| 5,600,121 A | * 2/1997 | Kahn et al. .................. | 235/472 |
| 5,679,941 A | * 10/1997 | Iizaka et al. ................ | 235/383 |
| 5,770,841 A | * 6/1998 | Moed et al. ................. | 235/375 |
| 5,880,451 A | * 3/1999 | Smith et al. ................. | 235/462 |
| 5,923,022 A | * 7/1999 | Penn et al. ............. | 235/462.08 |
| 6,000,618 A | * 12/1999 | Sparoretti .............. | 235/462.24 |
| 6,016,961 A | * 1/2000 | Hippenmeyer et al. ..... | 235/462 |
| 6,047,893 A | * 4/2000 | Saporetti ..................... | 235/462 |
| 6,135,352 A | * 10/2000 | Girotti ......................... | 235/454 |
| 6,142,376 A | * 11/2000 | Cherry et al. ........... | 235/462.14 |
| 6,168,080 B1 | * 1/2001 | Verschuur et al. ..... | 235/462.01 |
| 6,173,893 B1 | * 1/2001 | Maltsev et al. ........ | 235/462.09 |
| 6,193,160 B1 | * 2/2001 | Zembitski ............... | 235/472.01 |

FOREIGN PATENT DOCUMENTS

| | | |
|---|---|---|
| EP | 0390725 B1 | 10/1990 |
| JP | 2000-219317 | * 8/2000 |

* cited by examiner

*Primary Examiner*—Karl D. Frech
*Assistant Examiner*—Uyen-Chau Le
(74) *Attorney, Agent, or Firm*—Townsend and Townsend and Crew LLP

(57) ABSTRACT

A method of operating a bar code reader (16) in which one or more bar codes (25,26) are detected at different positions ($X_1$, $X_2$) within a scanning range of the bar code reader (16) by the latter, the scanning distance ($d_1$, $d_2$) between the bar code reader (16) and the respectively detected bar code (25,26) is found anf the position ($X_0$, $Y_0$, $Z_0$) and/or the scanning angle ($\alpha$, $\beta$, $\gamma$) of the bar code reader (16) is foubd from the respectively found scanning distance ($d_1$, $d_2$) and from known position data ($X_1$, $X_2$) of the detected bar code (25,26).

12 Claims, 2 Drawing Sheets

METHOD FOR DETERMINING THE POSITION AND/OR ORIENTATION OF A BAR CODE READER

FIELD OF THE INVENTION

The present invention relates to a method of operating a bar code reader which is formed for the scanning and detection of bar codes.

Such bar code readers are for example used for the sorting of articles bearing the bar code, with sorting of the articles taking place as a result of an association of a respectively detected bar code to one of the articles. For example, in a luggage conveying system of an airport each article of luggage can be provided with a bar code which characterizes the airport at the destination. By detecting the destination airport stored in the bar code and by associating the corresponding bar code to the respective article of luggage it is possible to effect sorting into different dispatch departments automatically in the transport apparatus.

The correct association between a detected bar code and the object bearing this bar code is in this respect normally carried out as follows:

First of all, on entry of the object into a so-called reading field, a starting signal for an incremental transducer is generated by a light barrier, with the incremental transducer delivering incremental signals corresponding to the speed of transport of the object. In this manner the position of the object in the transport apparatus can be determined at any time from the incremental signal, with respect to a reference point formed for example by the start of the reading field.

If now a bar code is detected inside the scanning range by the bar code reader then the position of the bar code at its time of detection is determined and a check is made as to which object was located at this position at the time of detection.

The bar code is then associated to the object which is found during this investigation.

If the objects are exclusively arranged in series in the transport direction then it is sufficient to determine and evaluate the position in the transport direction in order to achieve a correct association. If objects can however also be arranged alongside one another then a corresponding evaluation of a position or component perpendicular to the transport direction is also necessary. The determination of the object positions can take place in this arrangement also by means other than the described incremental transducer. The incremental path signal can, in particular, be replaced by a timer interrupt of constant frequency when the conveying speed is constant.

Several parameters must be taken into account in this arrangement in determining the position of the detected bar code. On the one hand the spacing between the bar code reader and the detected bar code at the time of scanning must be found, which can for example take place by a transit time measurement. The position of the detected bar code can then be found from this scanning distance and also the position and the scanning angle of the bar code reader.

The scanning angles give information concerning the tilting of the bar code reader with respect to a Cartesian coordinate system which is advantageously so aligned that the x-axis extends in the transport direction of the object, the y-axis extends perpendicular to the transport direction in the plane of transport, which is normally horizontally aligned, and the z-axis extends perpendicular to the transport plane, i.e. is normally vertically aligned. The scanning angle a then specifies the angle of rotation of the bar code reader with respect to the x-direction, i.e. $\alpha=0$ when the scanning line extends in the x-direction. The scanning angle $\beta$, also termed the skew angle, defines the tilting of the bar code reader in the x-direction, i.e. $\beta=0$ when the bar code reader scans the objects vertically from above parallel to the z-axis. The scanning angle y defines a lateral tilting of the bar code reader about the x-axis, i.e. $\gamma=0$ with a scanning of the objects vertically from above.

The positions of the bar code reader and also of the detected bar code are advantageously set forth by coordinates of the quoted Cartesian coordinate system, i.e. by an x-coordinate, a y-coordinate and a z-coordinate.

Problematic in the association of the detected bar code to the respective objects is the fact that the position of the bar code reader in space is relatively complicated to determine. This position is normally determined during the installation of a corresponding bar code reading system, whereby the complexity of the installation work is significantly increased.

If the position of the bar code reader is subsequently changed with an already installed system, for example by rebuilding or other external influences, then the position of the bar code reader must be newly determined, which cannot normally be carried out by the operator of the bar code reading system himself. Accordingly, in this case a specially trained service technician must be used for the new adjustment of the system or the determination of the position of the bar code reader.

In addition to the position of the bar code reader the scanning angle must normally be newly determined with a new installation or with a later installation. The scaling of the incremental path transducer is not known in all cases so that this scaling must in some cases also first be determined on installation of a corresponding system.

OBJECT OF THE INVENTION

It is an object of the invention to set out a method of operating a bar code reader with which the position of a bar code reader can be determined in a simple manner and largely automatically. Furthermore, it should also be possible to determine the scanning angle and the scaling of the incremental path transducer in a simple manner and as automatically as possible.

This object is satisfied in accordance with the invention by a method of operating a bar code reader in which one or more bar codes are detected at different positions within a scanning range of the bar code reader by the latter, the scanning distance between the bar code reader and the respectively detected bar code is found and the position and/or the scanning angle of the bar code reader is found from the respectively found scanning distance and from known position data of the detected bar code.

With the method of the invention the position and/or the scanning angle of the bar code reader can thus be found and stored in the bar code reader or in an evaluation circuit connected to the latter. The automatic finding of the position and/or the scanning angle of the bar code reader leads at least to a significantly simpler installation of a bar code reading system because the complicated manual determination of the position and/or the scanning angle of the bar code reader can be omitted.

The position of the bar code reader is in this arrangement advantageously determined as coordinates of a Cartesian coordinate system. If the bar codes are exclusively arranged lying one behind the other in the transport direction defined by the x-direction, then the determination of the x-coordinate is fundamentally sufficient for a correct association of the bar codes to the respective object.

Since the position and/or the scanning angle of the bar code reader was found using the described learning process of the invention, the normal operation, i.e. the scanning and association operation of the bar code reader, can be started, with the position and/or the scanning angles found in the learning process being used for the determination of the correct association.

In accordance with a preferred embodiment of the invention the position and/or the scanning angle of the bar code reader are found with respect to the scanning distances that are found and with respect to known relative positions of different bar codes relative to one another. For example, during the learning method, objects with a plurality of bar codes can be introduced into the scanning region of the bar code reader, with the geometrical positioning of the bar codes relative to one another being known. Thus the object can be for example be introduced into the scanning region such that two bar codes provided on the object have the same y- and z-coordinates and only have different x-coordinates, i.e. are only displaced relative to one another in the transport direction. When the spacing in the x-direction between the two bar codes is known, which represents the position of the bar codes relative to one another, then the x-coordinates of the bar code reader can be found after detection of the two bar codes by the bar code reader and the respective scanning distance found thereby.

It is basically possible for the objects with the bar code to be moved through the scanning regions so that the respective bar code is swept over by the scanning beam of the bar code reader during its transport movement. It is however also possible for the objects with the bar code to be introduced stationary into the scanning range so that the bar code can be swept over by the scanning beam in the stationary state. In this case the absolute position of the respective bar code can for example be directly determined, for example measured.

With a movement of the object bearing the bar code through the scanning range an incremental signal representative for the path traversed by the bar code is advantageously produced by an incremental path transducer coupled to the speed of movement, the actual incremental signal is in each case detected at the time of detecting a bar code, and the incremental transducer scale, i.e. the number of increments per traversed path, is respectively found from the known position data of the detected bar code and from the detected incremental signals.

If, for example, it is known that two bar codes arranged on an object are spaced 20 cm from one another in the x-direction then the difference from the two incremental transducer counts detected at the respective time of scanning of the bar codes can be formed and the scaling of the incremental path transducer, i.e. the number of increments per traversed path, can be found by forming the quotient of this difference and the known spacing.

By means of the scaling of the incremental path transducer the path traversed since starting the incremental transducer can then be found, for example also for each of the detected bar codes from the incremental signal found at the respective time of scanning, and this traversed path represents in each case the x-coordinate of the bar code at the time of scanning.

Further advantageous embodiments of the invention are set forth in the subordinate claims.

DESCRIPTION OF PREFERRED EMBODIMENTS

Figure 1:
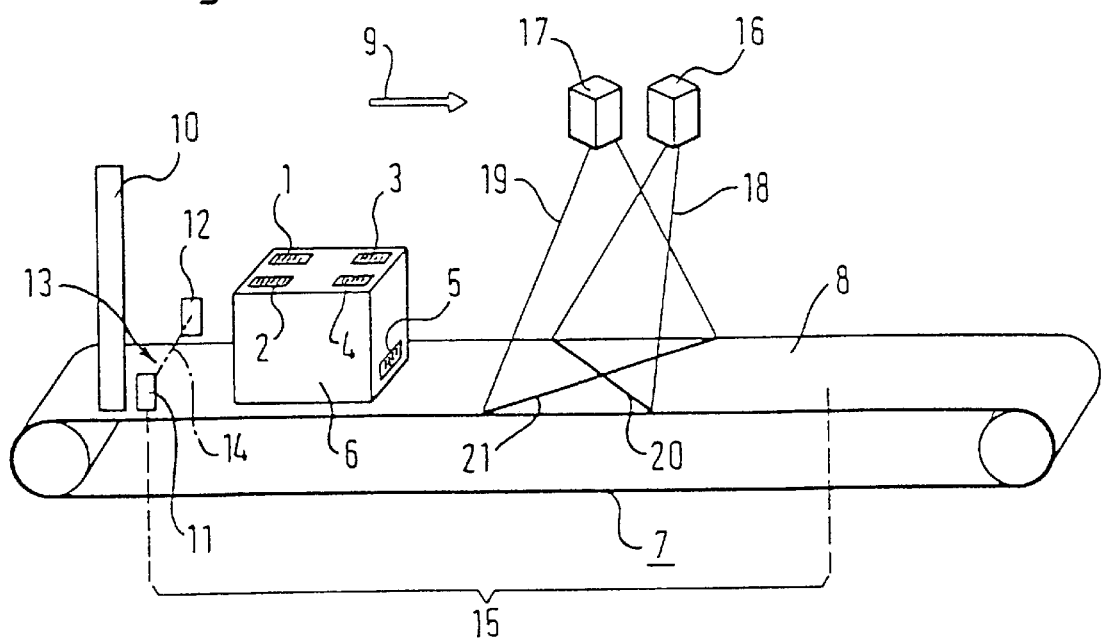
FIG. 1 is a schematic perspective illustration of a bar code reading system.

In FIG. 1 an object 6 provided with bar codes 1, 2, 3, 4, 5 is arranged on a conveyor belt 7 the upper run 8 of which can be moved in the direction of the arrow 9.

An optional height detection device 10 as well as a light barrier 13 including a transmitter 11 and a receiver 12 are arranged at the start of the conveyor belt 7 with a light beam 14 from the transmitter 11 being transmitted in the direction of the receiver 12. The light beam 13 defines the start of a reading range 15 in which the object 6 with the bar codes 1–5 is scanned by two bar code readers 16, 17 arranged above the conveyor belt 7.

For this purpose the bar code readers 16, 17 each transmit a respective scanning beam 18, 19, deflected for example via a polygonal mirror wheel, in the direction of the conveyor belt 7, so that scanning lines 20, 21 are formed on the conveyor belt 7.

On movement of the object 6 in the direction of the arrow 9 the bar codes 1–5 are each respectively swept over partly or fully by the scanning lines 20, 21, so that the information contained in the bar codes 1–5 is decoded and is supplied for further evaluation to a non-illustrated evaluation circuit. In this respect it is possible that bar codes which are only partly swept over are put together by the evaluation circuit into a full bar code and that the total bar code can be determined in this manner, i.e. the full bar code can be put together from a plurality of scanned segments of the bar code.

Figure 2:
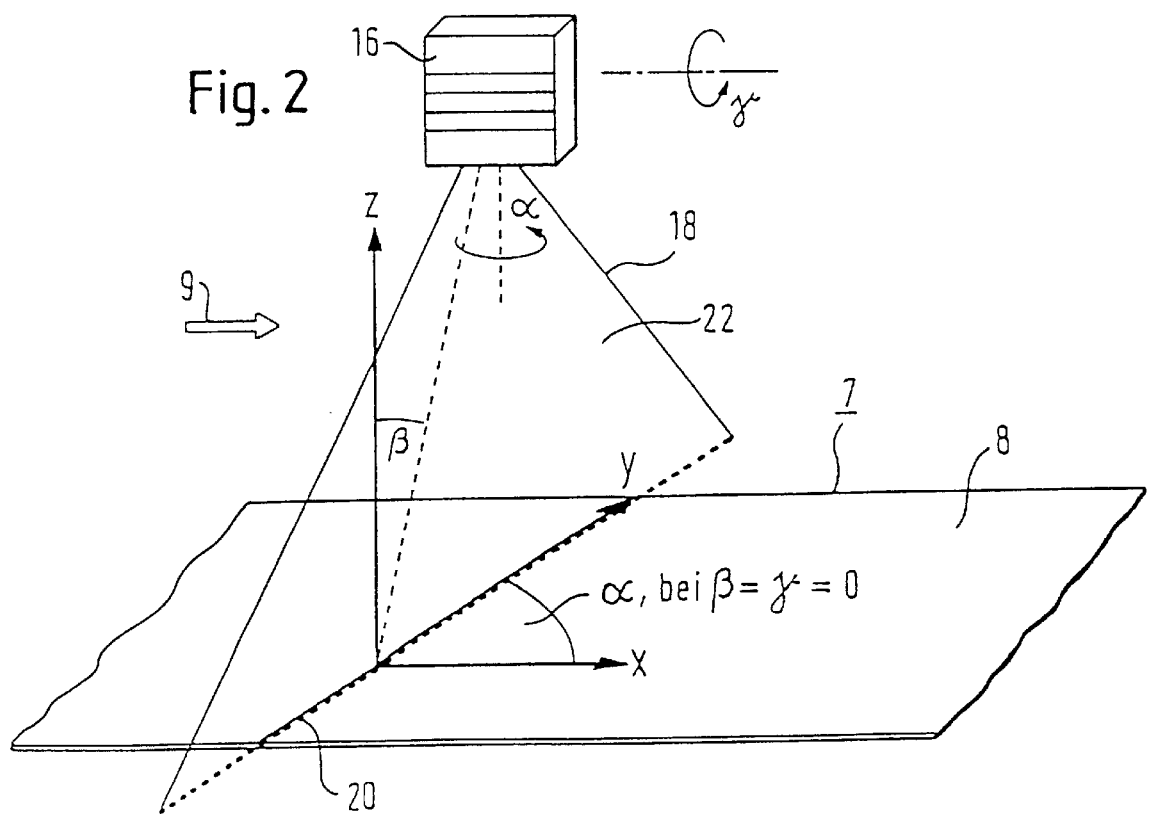
FIG. 2 is a detailed view of FIG. 1.

The different scanning angles $\alpha$, $\beta$ and $\gamma$ can be recognized from FIG. 2.

The angle $\alpha$ specifies a rotation of the bar code reader 16 about the z-axis, with $\alpha=0°$ when the scanning line 20 extends parallel to the x-axis.

The angle $\beta$ defines the tilting of the V-shaped scanning plane 22 formed by the periodically pivoted scanning beam 18 about the y-axis, with the angle $\beta$ being selected to be negative against the arrow direction 9 with the resultant scanning direction which can be seen in FIG. 2.

The angle $\gamma$ specifies a tilting of the bar code reader 16 about the x-axis so that an angle $\gamma=0$ corresponds to a reading taken vertically from above onto the conveyor belt 7 and an angle $\gamma \neq 0$ specifies the side reading.

Figure 3:
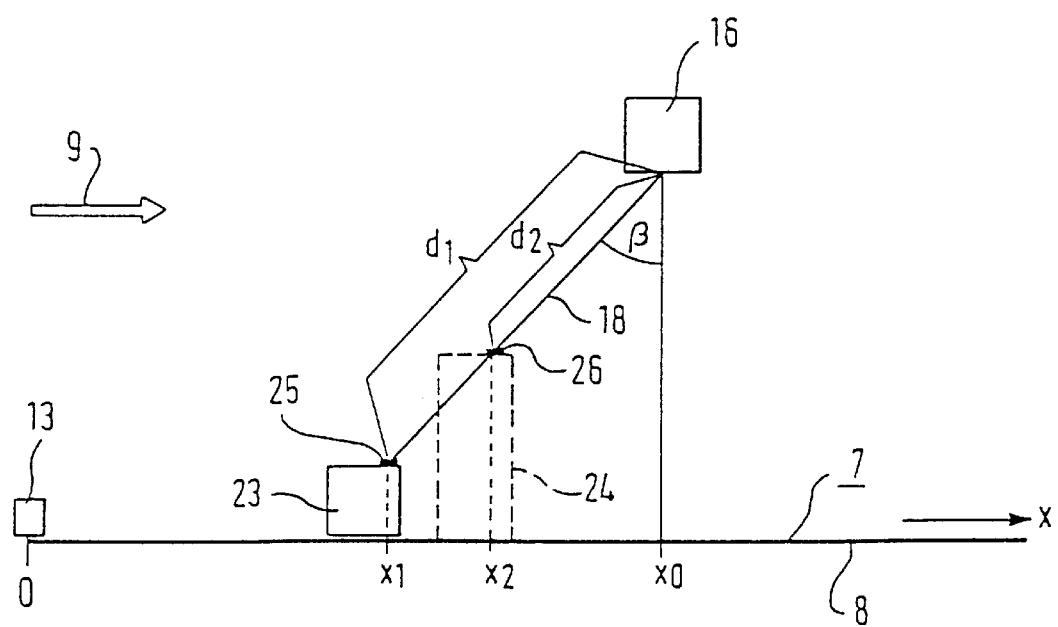
FIG. 3 is a schematic side view in accordance with FIG. 2.

From the schematic side view shown in FIG. 3 respective scanning distances $d_1$ and $d_2$ between the optical system of the bar code reader 16 and a respective bar code 25, 26 formed on a respective object 23, 24 can be seen. In this connection the x-coordinate of the bar code 25 with respect to the reference point defined by the light barrier 13 is specified by $x_1$ and the x-coordinate of the bar code 26 by $x_2$. The x-coordinate of the bar code reader 16 is specified by $x_0$.

The determination of the position of a bar code during the normal scanning operation can, for example, take place using the following equations with $\gamma=0$, i.e. with a reading from above:

$$x = x_0 + \sin(\text{scan}w) * d_0 * \cos(\beta_2) * \cos(\alpha) + d_0 * \sin(\beta_2) * |\sin(\alpha)|$$

$$y = y_0 + \sin(\text{scan}w) * d_0 * \cos(\beta_2) * \sin(\alpha) + d_0 * \sin(\beta_2) * |\cos(\alpha)|$$

$$z = z_0 - d_0 * \cos(\beta_2) * \cos(\text{scan}w)$$

For $\gamma \neq 0$ the position of the bar code results as follows with the values of the above-quoted equations:

$x_\gamma = x$ $y_\gamma = \cos(\gamma)*y + \sin(\gamma)*(z_0 - z)$ $z_\gamma = z_0 + \sin(\gamma)*y + \cos(\gamma)*z$ In order to be able to determine the relevant x-position value for the association of the bar code to the object carrying the bar code the count of the incremental transducer or counter to be associated with the bar code must be additionally taken into account.

scanw is the scanning angle which specifies the position of the scanned bar code within the scanning line 20. In this connection the angular bisector of the v-shaped scanning plane 22 is defined as scanw=0.

For the angle $\beta_2$ the equation $\beta_2 = \beta - (\text{schwingw})$ applies, with the swing angle schwingw reciting an optional pivoting of the V-shaped scanning plane 22 by which a three-dimensional scanning pyramid is produced in place of a scanning plane.

In order to be able to determine the scanning angle required in the scanning operation for the determination of the respective position coordinates of a bar code and also the coordinates of the bar code reader a learning process is carried out in accordance with the invention. This learning process will be described in more detail in the following with reference to FIG. 3.

In a first method step the object 23 is for example moved on the conveyor belt 7 past the light barrier 13, whereby a starting signal for an incremental transducer is produced. Through the movement of the conveyor belt the object 23 is moved into the position shown in FIG. 3 where the bar code 25 arranged on the top side of the object 23 is detected by the scanning beam 18 of the bar code reader 16.

At the same time as the detection the scanning distance $d_1$ is found by a distance measurement and is stored in an evaluation circuit. It is also possible to determine the height of the object 6 found via the optional height detection means 10 instead of a distance measurement and to determine the scanning distance from the known position of the bar code on the object 6.

If the scanning angles are known then the x-coordinate $x_0$ of the bar code reader 16 can be calculated from the equation quoted above.

If one of the scanning angles $\alpha$, $\beta$ or both scanning angles $\alpha$, $\beta$ are not known then a further object 24 with the bar code 26 or a plurality of additional objects can be introduced into the scanning region, with each of these objects being transported along the arrow direction 9 until the respective bar code located on the object is detected by the bar code reader 16 and the scanning distance $d_1$ (i=1, ..., n) is determined during this.

The scanning angles $\alpha$, $\beta$ and also the x-coordinate of the bar code reader 16 can be found from the above-quoted equations from the scanning distances that are found and also from the position values $x_1$, $x_2$ ... by a multiple use of the first equation.

In corresponding manner y- and z-coordinates $y_0$ and $z_0$ of the bar code reader 16 and also the scanning angles $\alpha$, $\beta$, $\gamma$ can also be found.

Through a sufficient number of learning processes with bar codes arranged at different positions within the scanning region all the spatial coordinates of the bar code and also all scanning angles and the scaling of the incremental path transducer can basically be found.

In many cases some of these values are however known as a result of the configuration effected during the production of the system. In particular, when a plurality of bar code readers which sweep over the conveyor belt at different angles are fastened into a unitary carrier frame, then the scanning angles are for example preset by the selected configuration. The scaling of the incremental path transducer is also as a rule known to the user since this is frequently made available by the user.

If the light barriers are arranged in a common frame then the respective spacing of a light barrier from the outer edge of the frame is normally known through the adjustment in the works, so that it is only necessary to calculate the spacing between the light barrier 13 defining the start of the reading region 15 and the outer edge of the frame for all light barriers together.

What is claimed is:

1. Method of operating a bar code reader in which, in order to determine at least one of a position and a spatial orientation of the bar code reader, one or more bar codes are moved through a scanning region, the bar codes are detected by the bar code reader at different positions within a scanning range of the bar code reader, a scanning distance between the bar code reader and the respectively detected bar code is found, one of a position and a scanning angle of the bar code reader is found from the respectively found scanning distance and from known position data of the detected bar code, and storing data determining one of the position and scanning angle of the bar code reader for user during subsequent bar code reading operations.

2. Method in accordance with claim 1 wherein relative positions of different bar codes to one another are known and the one of the position and the scanning angle of the bar code reader are found with reference to the relative positions and the scanning distances found.

3. Method in accordance with claim 1 wherein an incremental signal representative for the path traversed by the bar code is produced by an incremental path transducer coupled to a speed of movement of the bar code; wherein at a time of detection of a bar code an actual incremental signal is respectively determined and an incremental transducer scale, that is, the number of increments per traversed path, is found from the known position data of the detected bar code and from the incremental signals that are detected.

4. Method in accordance with claim 1 wherein the bar codes are each arranged stationary at predetermined positions within the scanning range.

5. Method in accordance with claim 1 wherein the position data of the bar code and the position found for the bar code reader are related to a common reference point.

6. Method of operating a bar code reader according to claim 1 including using the data determining one of the position and scanning angle of the bar code reader during normal operation when the bar code reader reads bar codes for correctly associating a read bar code with an object of which the read bar code is applied.

7. A method of determining the position of a bar code reader according to claim 6 including moving the object to which the read bar code is applied relative to the bar code reader.

8. A method for determining a position of a bar code reader comprising moving at least one bar code through a scanning region placing the bar code at a position within a scanning range of the bar code reader, detecting the bar code with the bar code reader, determining a scanning distance between the bar code reader and the detected bar code, providing bar code reader positioning data, determining at least one of a position of the bar code reader and a scanning angle of the bar code reader from the determined scanning distance and from known position data of the bar code, and storing the bar code reader positioning data for later use.

9. A method for determining the position of a bar code reader according to claim 8 including using the bar code reader positioning data during normal operation when the bar code reader reads bar codes for correctly associating a read bar code with an object to which the read bar code is applied.

10. A method for determining the position of a bar code reader according to claim 9 including moving the object to which the read bar code is applied relative to the bar code reader at least when using the positioning data.

11. A method for determining a position of a bar code reader comprising moving at least one bar code through a scanning region, placing the bar code at a position within a scanning range of the bar code reader, detecting the bar code with the bar code reader, determining a distance between the bar code reader and the detected bar code, generating positioning data, determining at least one of a position of the bar code reader and a scanning angle of the bar code reader from the determined distance and from known position data of the bar code, and thereafter using the positioning data for correctly associating a read bar code with an object to which the read bar code is applied.

12. A method for determining the position of a bar code reader according to claim 11 including moving the object to which the read bar code is applied relative to the bar code reader during determining the distance between the bar code reader and the detected bar code and during using the positioning data.

* * * * *